(No Model.)

H. D. & D. W. SWIFT.
JOURNAL BEARING FOR THE GUM BOX ROLLS OF ENVELOPE MACHINES.

No. 511,819. Patented Jan. 2, 1894.

Witnesses
Chas. F. Schmelz
H. M. Fowler

Inventors
Henry D. Swift
DeWheeler Swift
By their Attorney
Rufus B. Fowler

UNITED STATES PATENT OFFICE.

HENRY D. SWIFT AND DANIEL WHEELER SWIFT, OF WORCESTER, MASSACHUSETTS, ASSIGNORS, BY DIRECT AND MESNE ASSIGNMENTS, TO THE LOGAN, SWIFT & BRIGHAM ENVELOPE COMPANY, OF SAME PLACE.

JOURNAL-BEARING FOR THE GUM-BOX ROLLS OF ENVELOPE-MACHINES.

SPECIFICATION forming part of Letters Patent No. 511,819, dated January 2, 1894.

Application filed April 4, 1887. Serial No. 233,640. (No model.)

*To all whom it may concern:*

Be it known that we, HENRY D. SWIFT and DANIEL WHEELER SWIFT, citizens of the United States, residing at Worcester, in the county of Worcester and State of Massachusetts, have invented certain new and useful Improvements in Journal-Bearings for the Gum-Box Rolls of Envelope-Machines, of which the following is a specification, in connection with the accompanying drawings, representing so much of an envelope-machine as is necessary to set forth the nature of our present invention, which relates to that part of the envelope-machine known as the "gumming mechanism" and which consists in certain features of construction, as hereinafter set forth and specifically pointed out in the annexed claims, said invention having for its object to prevent the access of the gummed solution held in the gum-box to the bearing of the gum-box roll.

Figure 1:
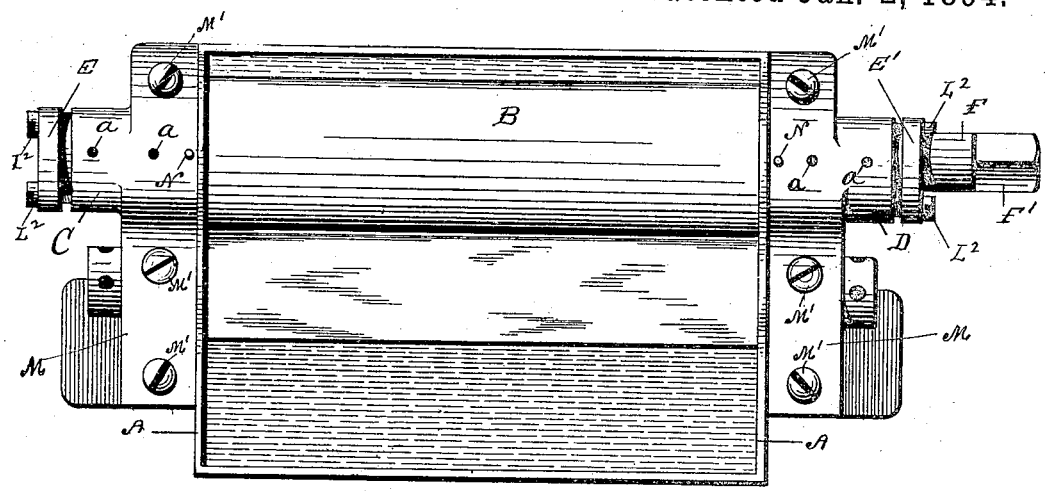
Figure 2:
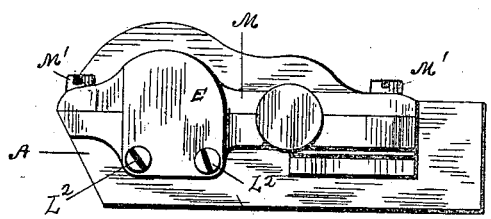

Figure 1 of the drawings represents a top view of a gum-box of the form and construction commonly used in envelope machines, and containing a rotating gum-box roll. Fig. 2 is an end view of the same, and Fig. 3 is a vertical sectional view of one of the journal bearings of the gum-box roll.

Similar letters refer to similar parts in the several views.

A, A, denotes a gum-box which is a shallow receptacle containing an adhesive solution and having a rotating roll B partially immersed in the solution and journaled in bearings C, D, in the sides of the box. The bearing C is closed at its outer end by a plate E. The corresponding plate E' at the end of the bearing D has an opening to allow the journal of the roll to project at F having a squared section F' to which power is applied to rotate the roll.

Figure 3:
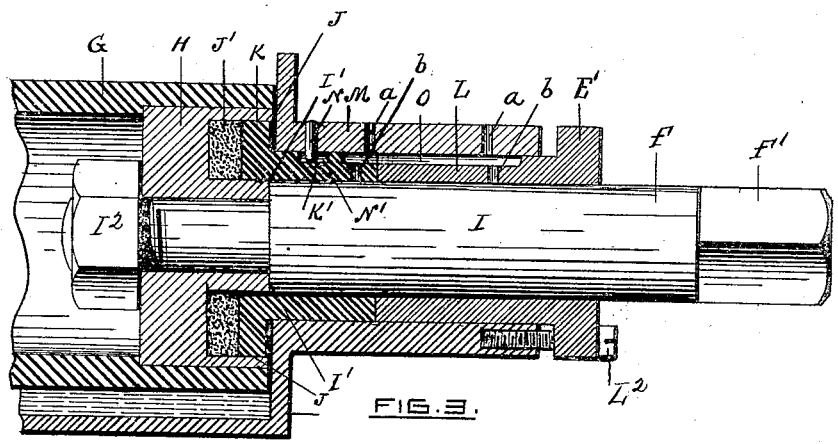

As the construction of the bearings C, D, are the same we have shown but one in sectional view in Fig. 3.

The roll B is preferably made of a hollow cylinder G with its ends closed by heads H each of which has a hole in the center to receive a stud I the shoulder I' of which is drawn against the head H by the nut $I^2$, and forms the journal of the roll. An annular recess J is formed in the head H in which is placed a washer J' of leather or some similar semi-elastic material and forming an annular packing which covers the bottom of the annular recess J. The annular recess J is concentric with the stud I and receives the flanged end K of the sleeve K', which bears against the semi-elastic washer J'. The sleeve K' accurately fits the stud I forming the journal of the roll B, and its flanged end is held with a firm pressure against the washer J' by means of the sleeve L, having the same external and internal diameter as the sleeve K', and provided with a flanged head E', through which the screws $L^2$ pass into the sides of the gum-box enabling the pressure of the flange K to be adjusted to prevent the flow of the solution around the end of the sleeve K'. The bores of the sleeves K' and L thus form a bearing for rotating journal of the gum-box roll and are themselves held in the sides of the gum-box by means of a cap M and screws M'. The sleeve L is held from turning by the screws $L^2$ and the sleeve K' is kept from rotating by a pin N held in the cap M and entering groove N' in the sleeve K', allowing a slight longitudinal sliding motion to the sleeve K'. A channel O is provided in the sleeves L and K' to receive oil through the oil holes $a, a$, which passes through the holes $b, b$, to the journal of the roll.

We are aware that a gum-box roll has been used having an annular recess for an elastic packing ring or washer and with a sleeve having means for pushing the same lengthwise against the ring or washer. In our present invention a steel stud I is used for the journal of the roll which is made of brass or a composition that will withstand the corrosive action of the gum solution. The inner sleeve with its flanged end is also made of a similar composition, while the outer sleeve L is made of iron or of other suitable material desired for a journal bearing.

We do not herein claim broadly a sleeve inclosing the journal of the gum box roll, neither do we claim an elastic washer placed between the sleeves and the ends of the gum box as such were shown, described and claimed in our application for Letters Patent, Serial No. 184,455, filed December 2, 1885.

What we claim as our invention, and desire to secure by Letters Patent, is—

1. The combination with the gum box roll of an envelope machine, having a recessed end and an elastic washer in said recess, of a sleeve capable of sliding on the journal of the gum box roll and having a flanged end resting on said elastic washer, and a sleeve capable of sliding on the journal of the gum box roll with its inner end resting against the end of the inner flanged sleeve and having means by which it is moved inwardly to press against the end of the inner flanged sleeve, substantially as described.

2. The combination with the gum box roll of an envelope machine having a recessed end and an elastic washer held in said recessed end, of a sleeve held in the sides of the box and having a flanged end fitting the recess in the end of the roll and resting against said elastic washer, a following sleeve with its inner end bearing against the end of the sleeve pressing upon said elastic washer, said following sleeve being provided with a flanged outer end, and tightening screws passing through said flanged outer end and entering the sides of the gum box, by which said sleeves are drawn toward said elastic washer, substantially as described.

3. The combination with the gum box roll of an envelope machine having a recessed end and an elastic washer held in said recess, of a sleeve held in the sides of the gum box and having a flanged end resting against said elastic washer, said sleeve being provided with a longitudinal groove, a pin held by the box and entering said groove, by which said sleeve is held from rotation and a following sleeve provided with means by which it is pressed against said flanged sleeve, substantially as described.

HENRY D. SWIFT.
D. WHEELER SWIFT.

Witnesses:
JOHN S. BRIGHAM,
RUFUS B. FOWLER.